US012776645B2

(12) United States Patent
Wang et al.

(10) Patent No.: US 12,776,645 B2
(45) Date of Patent: Oct. 27, 2026

(54) METHOD AND APPARATUS FOR CONTROLLING A CURRENT FOR SOLID-STATE CIRCUIT BREAKERS

(71) Applicant: UNIVERSITY OF TENNESSEE RESEARCH FOUNDATION, Knoxville, TN (US)

(72) Inventors: Fei Wang, Knoxville, TN (US); Zhou Dong, Raleigh, NC (US)

(73) Assignee: UNIVERSITY OF TENNESSEE RESEARCH FOUNDATION, Knoxville, TN (US)

( * ) Notice: Subject to any disclaimer, the term of this patent is extended or adjusted under 35 U.S.C. 154(b) by 161 days.

(21) Appl. No.: 18/805,728

(22) Filed: Aug. 15, 2024

(65) Prior Publication Data

US 2025/0062608 A1 Feb. 20, 2025

Related U.S. Application Data

(60) Provisional application No. 63/532,853, filed on Aug. 15, 2023.

(51) Int. Cl.
*H02H 9/02* (2006.01)
*H02H 1/00* (2006.01)
*H02H 3/08* (2006.01)
*H02H 3/087* (2006.01)

(52) U.S. Cl.
CPC .......... *H02H 9/025* (2013.01); *H02H 1/0007* (2013.01); *H02H 3/085* (2013.01); *H02H 3/087* (2013.01)

(58) Field of Classification Search
CPC ...... H02H 9/025; H02H 1/0007; H02H 3/085; H02H 3/087; H02H 3/025
USPC .......................................................... 361/93.1
See application file for complete search history.

(56) References Cited

U.S. PATENT DOCUMENTS

2013/0154391 A1* 6/2013 Urciuoli .................. H02M 1/32 327/109
2014/0029152 A1* 1/2014 Mazzola ............ H03K 17/6871 361/115
2016/0079401 A1* 3/2016 Zhang ....................... H02H 3/08 361/57
2021/0006063 A1* 1/2021 Mackey ............... H02H 1/0007
2022/0085600 A1* 3/2022 Qi ............................ H02H 3/08
2022/0231684 A1* 7/2022 Mehrotra ............. H03K 17/102
2023/0046316 A1* 2/2023 Liu ........................ H01H 9/542

* cited by examiner

*Primary Examiner* — Sreeya Sreevatsa
(74) *Attorney, Agent, or Firm* — Thomas | Horstemeyer, LLP

(57) ABSTRACT

Solid-state circuit breakers (SSB) have a fault current limiting function that limit the fault current in power applications. It allows sustained overcurrent for a certain period while preventing the fast fault current increase in dc systems. For the conventional method of using switches alone to limit the current, the high loss results in a short withstand time and low current limiting capability of the SSCBs. Disclosed are various embodiments for a control strategy to use one or more energy absorption components to handle the major part of the energy during a current limiting stage to increase the current limiting capability for series-connected SSCB switching cells.

22 Claims, 10 Drawing Sheets

Series-connected SSCB switching cells

Comparison of Energy Dissipated Using Different Methods

| Methods | Energy generated & dissipated (J) | | | | Withstand time (μs) |
|---|---|---|---|---|---|
| | $S_1$ | $S_2$ | $T_1$ | $T_2$ | |
| Conventional | 0.56 | 0.56* | 0 | 0 | 38 |
| Proposed (no load inductance) | 0.57 | 0.47 | 1.36 | 1.38 | 140 |
| Proposed (38 μH load inductance) | 0.42 | 0.49 | 1.46 | 1.39 | 140 |

*Assume $S_2$ has the same energy generated as $S_1$

FIG. 10

METHOD AND APPARATUS FOR CONTROLLING A CURRENT FOR SOLID-STATE CIRCUIT BREAKERS

CROSS-REFERENCE TO RELATED APPLICATIONS

This application claims the benefit of and priority to U.S. Provisional Patent Application 63/532,853 entitled "METHOD & APPARATUS FOR CONTROLLING A CURRENT," and filed on Aug. 15, 2023, which is incorporated herein by reference in its entirety.

STATEMENT REGARDING FEDERALLY SPONSORED RESEARCH OR DEVELOPMENT

This invention was made with government support under contract DE-AR0001467 awarded by Department of Energy. The government has certain rights in the invention.

BACKGROUND

With emerging direct current (dc) distributions in electrical systems, protection becomes more challenging due to the lack of zero current crossings, and fast rising fault current caused by large dc-link capacitance and low fault impedance. Solid-state circuit breakers (SSCBs) can function effectively in dc systems and also can provide fast protection. Even with their fast interruption capability, the fault current limiting (FCL) function is often desired for SSCBs for more intelligent protection coordination in a system. It allows the SSCB to have a longer sustained time before trip and avoid the risk of a very high short circuit fault current. Moreover, it can limit the unwanted current contribution to the fault, which also mitigates voltage sags.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 10 is a table of a comparison of energy dissipated using different methods, according to one example of the present disclosure.

DETAILED DESCRIPTION

Figure 1:
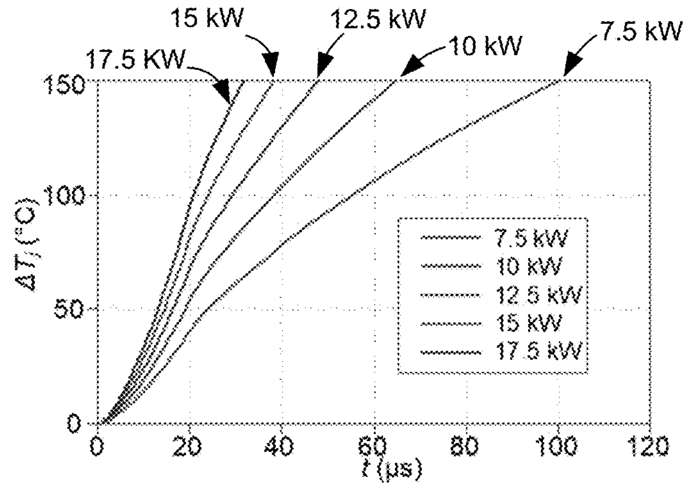
FIG. 1 is a temperature graph under different loss conditions, according to one example of the present disclosure.

The embodiments of the present disclosure relate to using one or more energy absorption components to handle a portion of energy during a current limiting stage to increase a current limiting capability for series-connected solid-stated circuit breaker switching cells. Various embodiments of the present disclosure have been experimentally verified to have more than three times the current limiting withstand time compared to conventional control strategies. In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

With emerging direct current (dc) distributions in electrical systems, protection becomes more challenging due to the lack of zero current crossings, and fast rising fault current caused by large dc-link capacitance and low fault impedance. Solid-state circuit breakers (SSCBs) can function effectively in dc systems and also can provide fast protection. Even with their fast interruption capability, the current limiting function is often desired for SSCBs for more intelligent protection coordination in a system. It allows the SSCB to have a longer sustained time before trip and avoid the risk of a very high short circuit fault current. Moreover, it can limit the unwanted current contribution to the fault, which also mitigates voltage sags (e.g., voltage dips).

Some methods for embedding the current limiting function into the SSCBs can include adding inductors or resistors and operating in the chopper mode with freewheeling diodes. For the first solution, it can enable a long current limiting withstand time but is likely to be bulky and heavy, which is not suitable for applications requiring high power density. Moreover, it could increase the conduction loss during normal operations. For the second solution, by operating the main switches in high-frequency switching mode with freewheeling diodes, the current limiting is achieved. Since the extra components added are mainly semiconductor devices with low volume and weight, this solution can feature higher power density compared to the first solution. However, the switching mode operation brings the high conducted and radiated EMI issue. Moreover, when the fault happens very close to the SSCB, it causes a near-zero inductance for the chopper, which could cause a high fault current.

The embodiments of the present disclosure are directed to an approach for embedding the current limiting function within SSCBs using the saturation mode of a switch with a lower gate voltage. However, during the fault current limiting mode, the semiconductor devices need to withstand high power loss and heat. Thus, the current limiting withstand time for such a solution is relatively short, especially for wide bandgap (WBG) devices.

The examples of the present disclosure improve the current limiting time of a saturation-mode semiconductor device based method without compromising its advantages. In some examples, the embodiments of the present disclosure use the energy-absorbing elements of SSCBs. These energy-absorbing elements are highly suitable for SSCBs with series-connected switching cells, which can be used to achieve sufficient voltage blocking in medium and high voltage applications. Compared to existing approaches, the advantages of the various embodiments of the present disclosure are, 1) Current limiting time is improved by a factor of 3-4 compared to existing saturation-mode current limiting SSCB;
2) No additional hardware is needed, leading to compact implementation;
3) Can be readily applied to existing series connected SSCB switching cells without hardware modification;
4) Simple and easily implementable control strategy; and
5) No high frequency switching and related EMI issues, and the embodiments are not sensitive to the fault location.

Challenges of Using Wide Bandgap Devices for Current Limiting

Wide Bandgap (WBG) devices are attractive for SSCB applications because of their low specific on-resistance Ron. However, it is challenging to use them for current limiting due to their weak pulse power capability. For example, GaN high electron mobility transistors (HEMTs) cannot withstand a short-circuit current for more than 3 μs. For current limiting with lower gate voltage, the withstand time can be longer. As an example of power transistor GS-065-150 (650 V and 150 A rated @ $T_c$=25° C.) from Infineon® (formerly GaN Systems), the junction temperature rises under different loss conditions are shown in FIG. 1 based on the thermal impedance model provided in the official LTspice model. With 250 V and 60 A stresses (15 KW) during the current limiting stage, it only takes around 38 us for the device junction to reach the temperature limit of 175° C. starting from an ambient temperature of 25° C., which is insufficient for the system protection coordination. As an example, an aircraft application normally requires sustaining the peak let-through current for at least 100 μs.

Figure 2:
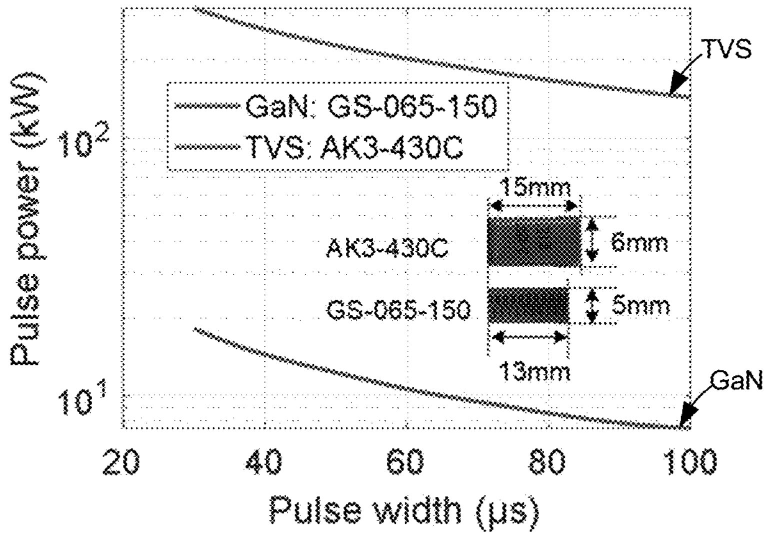
FIG. 2 is a comparison graph of pulse power capabilities of different components, according to one example of the present disclosure.

There are some dedicated energy absorption components in the SSCB, e.g., Transient voltage suppression (TVS) diodes, that feature much higher pulse power and energy capability. As an example, AK3-430C from Littelfuse company has a similar package area to GS-065-150. The pulse power capabilities of the two components under different pulse widths are compared in FIG. 2. The TVS diode has more than 10× pulse power capability and the reasons are as follows.

1) The TVS diode can have a transient maximum junction temperature of 275° C. without degradation, which gives a higher temperature rise margin.
2) The TVS diode can be designed much thicker for a greater mass. Also with higher specific heat, the energy required for the same temperature rise can be much greater.

On the other hand, commercial WBG devices still have limited breakdown voltage. For example, commercial GaN HEMTs are limited to 650 V nowadays. Luckily, in SSCB applications, the series connection is popular owing to the natural voltage balance with the voltage clamping by the paralleled energy absorption components. Moreover, the series connection would not have a penalty on the conduction loss because the specific Ron is proportional to the square of the device breakdown voltage for the same material. Therefore, the design approach depicted and described subsequently combines TVS diodes with high-electron-mobility transistor devices (e.g., GaN HEMTs) to maximize the current limiting capability of the SSCB with series-connected switching cells.

Current Limiting Control Strategy Example

Figure 3:
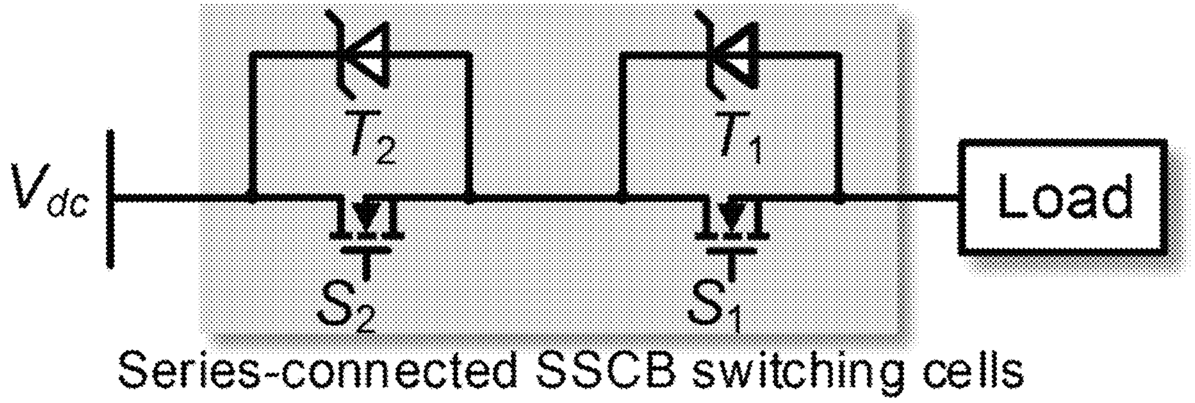
FIG. 3 illustrates a diagram of multiple series-connected solid state circuit breaker switching cells, according to one example of the present disclosure.

In one non-limiting example, a current limiting control strategy is described for series-connected SSCB switching cells. FIG. 3 shows a non-limiting example of a system that includes two series connected commonly used SSCB switching cells. The switch devices (first switch $S_1$ & second switch $S_2$) can be used to open and close the SSCB, while the energy absorption components (TVS diode $T_1$ & TVS diode $T_2$) can be used to absorb the inductive energy and clamp the device voltage when the SSCB opens.

In some examples, the switch devices are GaN HEMTs, such as GS-065-150 from Infineon®. Other suitable switches can be used, including IGBT, Si MOSFETs, SiC MOSFETs, and etc. Also, the TVS diodes are non-limiting examples of energy absorption components. Other non-limiting examples of energy absorption components can include a snubber circuit, a voltage-dependent resistor, a metal-oxide varistor (MOV), a capacitor, and other suitable energy absorption components.

The examples of the present disclosure can use the high pulse power capability of energy absorption components (e.g., TVS diodes) to absorb a major part of the energy and utilize GaN HEMT (e.g., $S_1$ & $S_2$) to control the limited current level. It can be achieved by operating one device in saturation mode while turning off the other device to break down the TVS diode to take the major part of $V_{dc}$. When one switch approaches its temperature limit, the circuit can alternate to the other switch thereby fully utilizing the SSCB module. In some examples, the temperature limit is at or approximate to a temperature limit for the switch and the temperature limit can be stored in a microcontroller or a computing device. The temperature can be calculated based at least in part the power dissipated across the switch and the dynamic thermal impedance.

Operating Principle

Figure 4A:
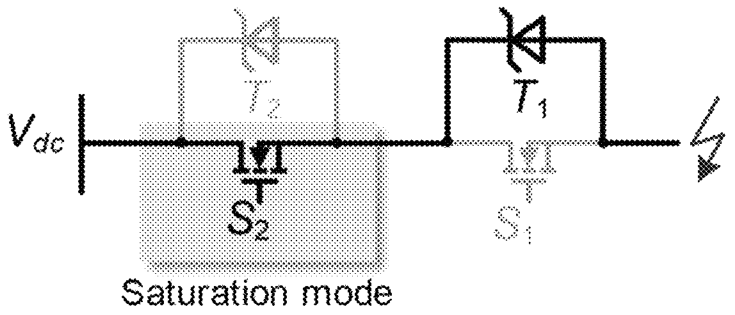
FIGS. 4A and 4B illustrate operating modes of a current limiting control technique in a first circuit example, according to one example of the present disclosure.
Figure 4B:
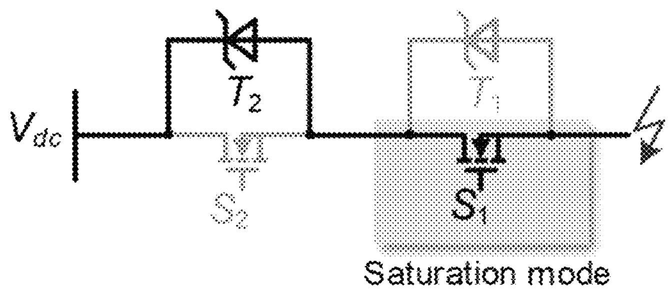

The non-limiting example of the current-limiting control strategy of the SSCB operates in two modes as shown in FIGS. 4A and 4B. FIG. 4A illustrates a first operating mode and FIG. 4B illustrates the second operating mode. The jagged arrows can represent an overcurrent or short circuit event (e.g., a fault current) occurring on the circuits. In the first operating mode, $S_2$ is controlled in saturation mode by adjusting its gate voltage to limit the current, and $S_1$ is turned off. In some examples, $S_2$ is adjusted by reducing the gate voltage to saturation mode. For instance, the voltage is lower than the normal driving on voltage (~5V for GaN). To limit current or work on the saturation mode, the voltage needs to be lower than 5V, for example to be 3V based on the limited current level. The voltage $V_{gate}=I_d/gfs+V_{th}$, where $I_d$ is the limited current, gfs is the transconductance of the GaN device, and Vth is the threshold voltage of the GaN device. For the other transistor $S_1$, it is turned off, which means the gate voltage is 0V.

As explained above, the major part of the energy is dissipated by the TVS diode $T_1$ based on the voltage distribution. Then, the SSCB switches to the second operating mode as shown in FIG. 4B, where $S_1$ is controlled in the saturation mode, and $S_2$ is turned off so that $T_2$ consumes the major part of the energy.

Compared to the previously used method of operating both switches $S_1$ and $S_2$ in saturation mode at the same time to limit the current, the methods described for the present disclosure use all power components to absorb the energy by applying the two modes. Besides, with the high energy absorption capability of TVS diodes taking most of the energy, the current withstand time can be much longer than using switches alone for the same current-limiting level. Moreover, the methods for the present disclosure can use the control scheme to increase the current limiting capability of the dc SSCB without any extra hardware.

Selection of TVS Diodes

For SSCB applications, the overall clamping voltage of the TVS diodes needs to be higher than $V_{dc}$ to extinguish the fault current when the switches turn off. Thus, the clamping voltage of one TVS diode $V_{cl}$ should be higher than $V_{dc}/2$. This is the reason why TVS diodes dissipate more energy than semiconductor devices in the proposed control approach. Specifically, for the proposed control strategy, to make the TVS diode break down in each mode, $V_{cl}$ should be lower than $V_{dc}$. Otherwise, the current would keep decreasing during the current limiting period because of the higher clamping voltage than $V_{dc}$. Therefore, $V_{cl}$ is recommended to be between $V_{dc}$*2 and $V_{dc}$. The closer to $V_{dc}$, the more energy is taken by TVS diode and vice versa. The energy dissipated in each TVS diode is approximately $V_{cl}*I_{cl}*t_{cl}$, which also needs to be considered when selecting TVS diodes. $I_{cl}$ is the limited current level and $t_{cl}$ is the maximum current limiting time.

Coordination of Switches

The coordination of the two switches is not a concern as long as the timing mismatch is controlled within tens of nanoseconds. There are two kinds of mismatches. First, two switches have some overlapped turn-on time. In this short transition, both switches will be in the current limiting mode, which is the same as the conventional approach. Moreover, since this overlap time can easily be controlled to be short, the energy dissipation can be ignored compared to the whole current limiting period. Second, if two switches have some overlapped turn-off time, then the fault current will go through two TVS diodes. The breakdown voltage of two series TVS diodes is higher than the input voltage, which helps to reduce the fault current. This is also acceptable considering the short overlap time.

Figure 4C:
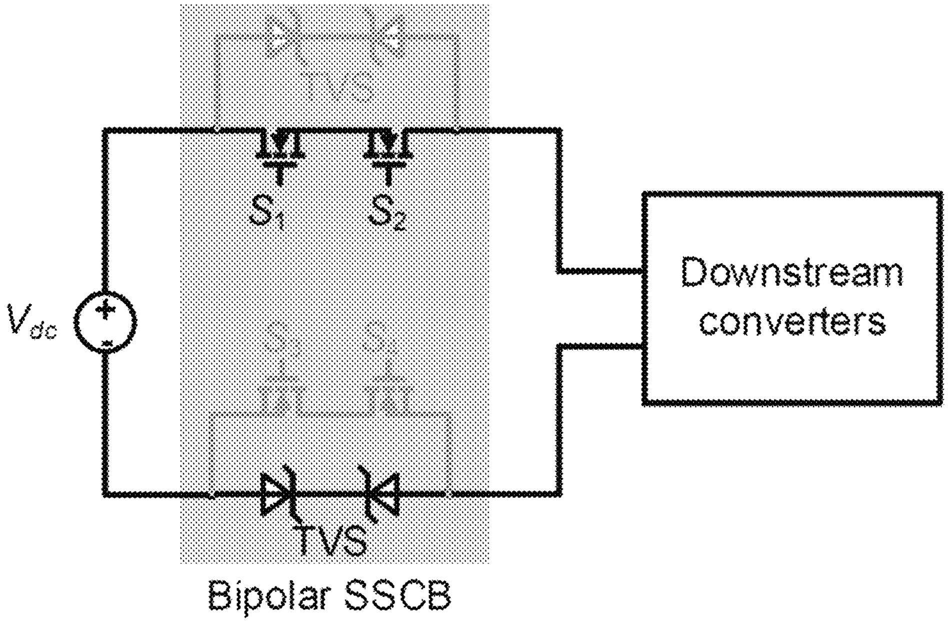
FIGS. 4C and 4D illustrate operating modes of a current limiting control technique in a second circuit, according to one example of the present disclosure.
Figure 4D:
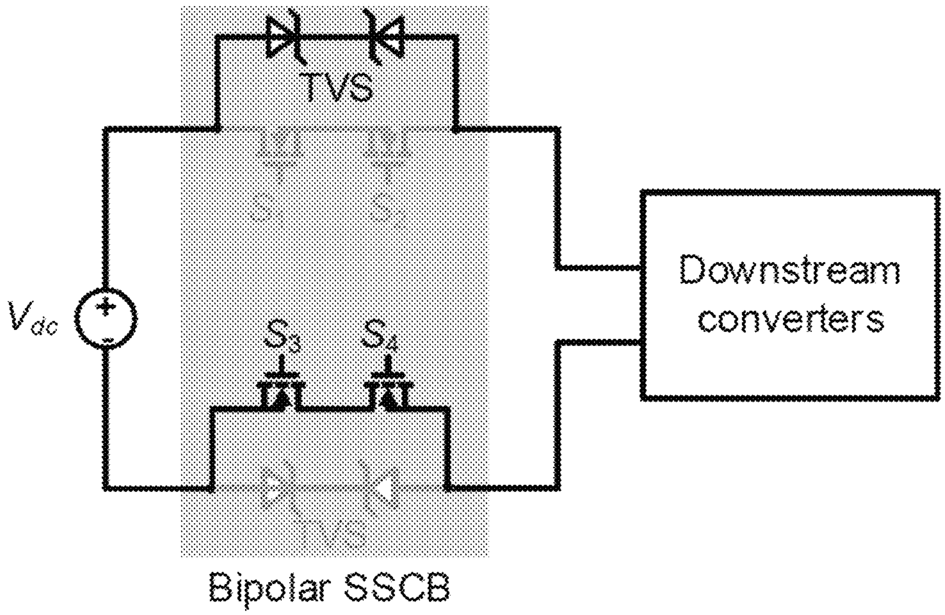

FIGS. 4C and 4D illustrates another example circuit for illustrating a current limiting capability of solid state circuit breakers. FIGS. 4C and 4D illustrate a bipolar SSCB for DC system applications, which is commonly used owing to its symmetricity. The bipolar SSCB comprises two series SSCB switching cells in positive and negative bus separately. The energy absorption unit, which is the TVS diode, in this case, is designed to absorb the line inductance energy during short circuit protection. The current limiting function is required when overload or short-circuit happens for downstream converters. The commonly used method is to control the semiconductor switches S1, S2, S3, and S4 in saturation mode to limit the current. However, the surge capability of the semiconductor switches is low which results in short current limiting withstand time.

The proposed current-limiting control scheme of the SSCB operates in two modes, in which FIG. 4C illustrates a first operating mode and FIG. 4D illustrates a second operating mode. In the first operating mode, the semiconductor switches ($S_1$ and $S_2$) in the positive line are controlled in the current limiting mode by adapting the gate voltage, and semiconductor switches ($S_3$ and $S_4$) in the negative line are turned off. In some examples, the clamping voltage of the TVS diodes is selected larger than half of the input voltage. Therefore, the major part of the energy is dissipated by TVS diodes based on the voltage distribution. In the second operating mode, the semiconductor switches ($S_3$ and $S_4$) in the negative line are controlled in the current limiting mode by adapting the gate voltage, and semiconductor switches ($S_1$ and $S_2$) in the positive line are turned off. By applying the two modes, all semiconductor switches and TVS diodes can be used to absorb the energy during the current limiting mode. Moreover, with the high energy absorption capability of TVS diodes taking most of the energy, the current limiting withstand time can be more than twice higher than using semiconductor switches alone as calculated for the same current-limiting level.

Except for the bipolar structure, the control method can be applied to any conditions with series SSCB switching cells. The energy absorption unit can be TVS diodes, metal oxide varistors (MOV) s, or other suitable snubber circuits. The SSCB can be unidirectional or bidirectional depending on whether a unidirectional switch or bidirectional semiconductor switches are used. If bidirectional semiconductor switches are used, the SSCB can be applied to both alternating current (AC) and direct current (DC) applications.

Case Study

Figure 5:
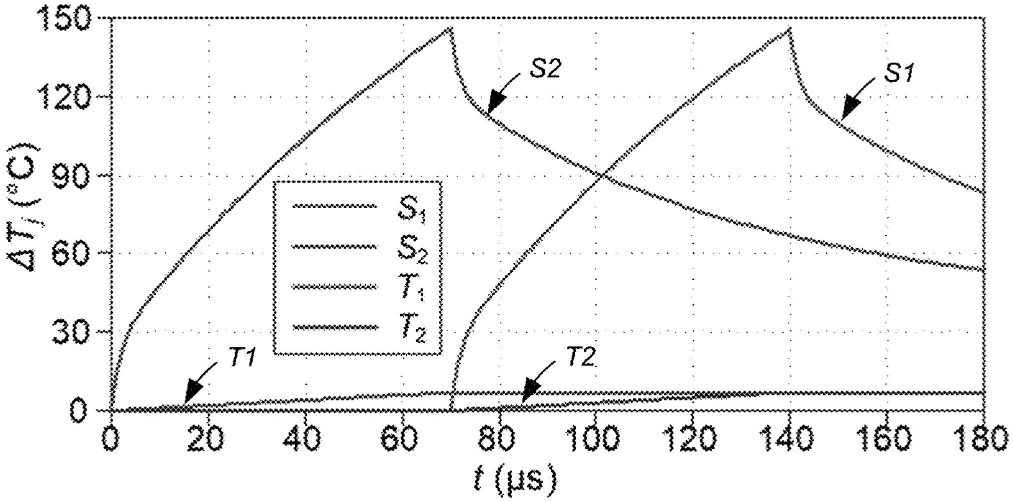
FIG. 5 is a temperature graph of components in series-connected solid state circuit breaker switching cells, according to one example of the present disclosure.

A system with 500 V $V_{dc}$ and 2 SSCB switching cells is considered, where $S_1$ and $S_2$ are GaN HEMTs GS-065-150, and $T_1$ and $T_2$ are TVS diodes AK3-430C. Using 2 GaN HEMTs in series for the current limiting of 60 A results in 250 V voltage stress and 15 KW transient power loss in each device. The withstand time is 38 us based on FIG. 1 assuming balanced voltage distribution. With the proposed current limiting control strategy, the TVS diode takes around 350 V so that each GaN HEMT only has 150 V voltage stress and 9 kW power loss. The withstand time can be 70 μs for each mode and 140 μs for both 2 modes, which is ~3.7× of the conventional method. For the TVS diode, the loss is 27 KW, which is much less than the pulse power capability (184 KW) for a 70 μs pulse width. The extra pulse power capability can still be used to absorb the loop inductance energy when the SSCB opens. The junction temperature rises for GaN HEMTs and TVS diodes using the proposed control strategy are simulated and shown in FIG. 5. The GaN HEMTs approach the temperature limit while the TVS diodes have a limited temperature rise (<10° C.) compared to the GaN HEMTs. Although the dynamic thermal impedance model could have some inaccuracies in the simulation, it is still a fair comparison when both conventional and proposed methods use the same model to estimate the junction temperature and current limiting capability.

This current limiting function with us range period can give a delay to the short circuit protection to suppress the effect of noise. On the other hand, for some applications, the current limiting withstand time could be as long as ms range to coordinate with other breakers, paralleling of the devices can be applied. A similar analysis or simulation can be implemented to select the device and the parallel number to ensure that the device junction temperature can be limited within the maximum value. In any case, the proposed control strategy requires a lower current rating device or less paralleling compared to the conventional method because the required energy dissipation for the GaN HEMTs is smaller.

Experimental Results

The proposed current limiting strategy is experimentally verified in this section and compared with the conventional approach to verify the benefits. The rated voltage for the test is set as 500 V and the limited current level is around 60 A. Note that since the main objective of the experiment is to verify the current limiting capability of the proposed control strategy, only the open loop control is implemented. For the closed loop control, the proposed approach can follow a conventional approach.

Test Circuit and Platform

Figure 6A:
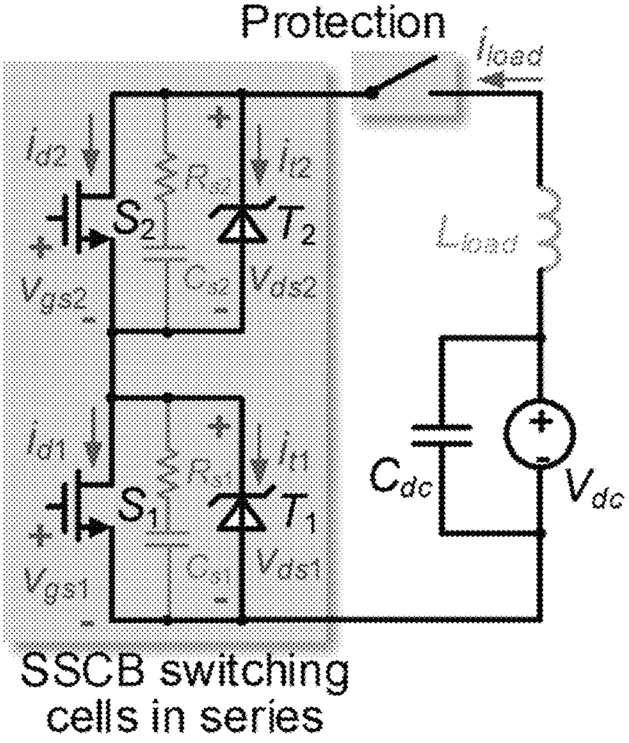
FIGS. 6A and 6B illustrate diagrams of a test circuit and a test platform, according to one example of the present disclosure.
Figure 6B:
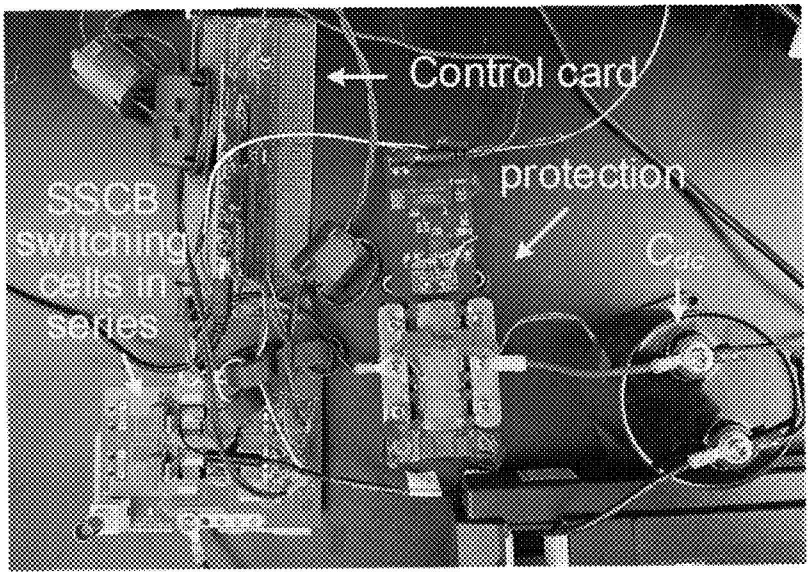

The test circuit and platform are shown in FIGS. 6A and 6B. It includes 2 series-connected SSCB switching cells. Each switching cell has one power transistor GaN HEMT GS-065-150 and one TVS diode AK3-430C. The series of 2 switching cells are needed to make sure the overall clamping voltage is higher than $V_{dc}$ to ensure that the SSCB can interrupt the fault current, which is valid for cases with both conventional and proposed current limiting control strategy. Besides, an RC snubber, which is optional, is paralleled with each switching cell to suppress the overvoltage during turn-off. The RC snubber design follows the analysis in to minimize the voltage spike during turn-off. The designed values are 150 nF for capacitance and 0.5Ω for resistance. A load inductance Load is optional for emulating the fault conditions with cable inductance in the loop. A protection switch is also applied to protect the devices under test.

Test Results of Conventional Current Limiting Strategy

Figure 7:
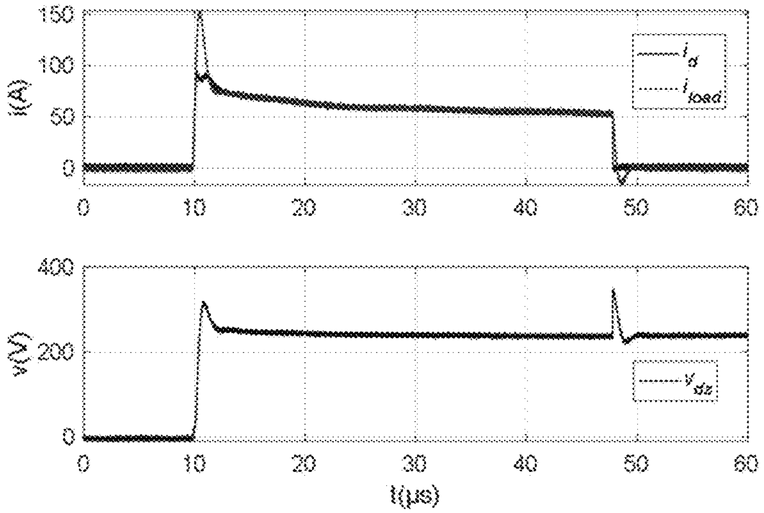
FIG. 7 illustrates test waveform graphs, according to one example of the present disclosure.

For the conventional current limiting strategy, both of the two GaN HEMTs are in saturation mode to limit the fault current. The voltage across the two switches needs to be balanced for the optimal operating condition. To simplify the test, only 1 GaN HEMT is used in the test with half of the rated dc input voltage. The gate-to-source voltage is set at around 1.8 V to limit the current to around 60 A. FIG. 7 shows the test waveforms, which are for the condition without load inductance. The voltage is measured by the differential probe TMDP0200 from Tektronix, and the current is measured by the Rogowski coil CWT3 from PEM. The device successfully limits the current at around 60 A with 250 V voltage stress for 38 μs, which is the maximum current limiting withstand time from the thermal simulation model. Note that there are overshoots of both voltage and current at the beginning of the current limiting, which is because the device has a lower junction temperature at the beginning of the current limiting period. The GaN HEMT has a higher saturation current with a lower junction temperature under the same gate-to-source voltage condition. This current variation is acceptable for the SSCB reaction to a system with potential faults. Compared to $i_d$, $i_{load}$ has a current spike at the beginning of the current limiting, which is because extra current is needed to charge the device output capacitance and the capacitor of the RC snubber.

Test Results of Current Limiting Strategy Example

Figure 8:
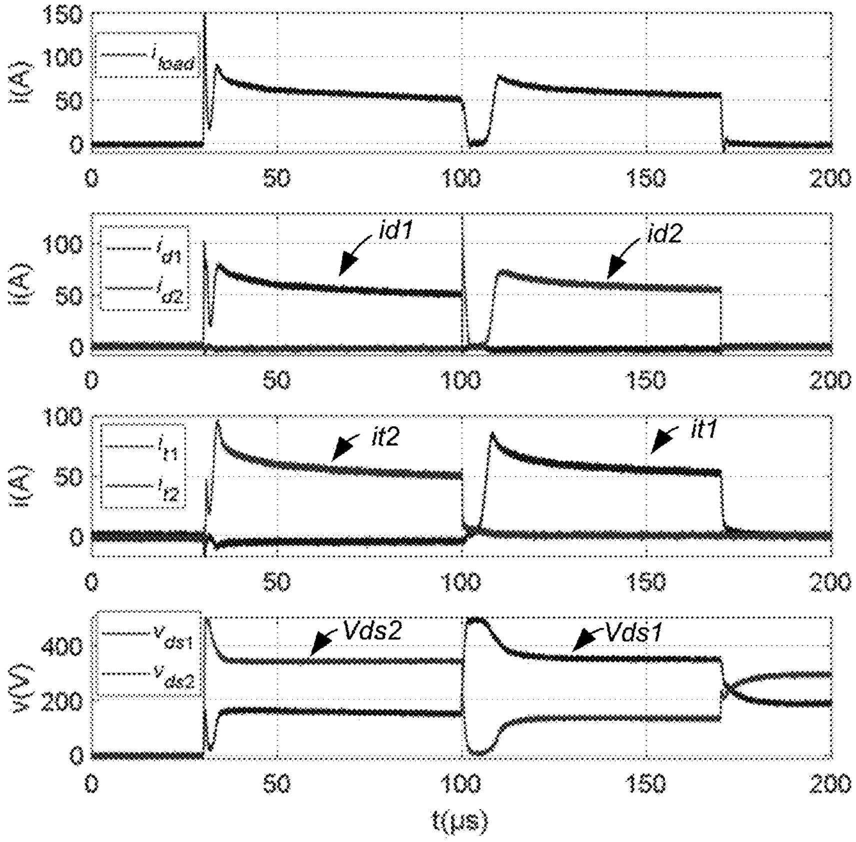
FIG. 8 illustrates test waveform graphs of an example limiting control technique without load inductance, according to one example of the present disclosure.
Figure 9:
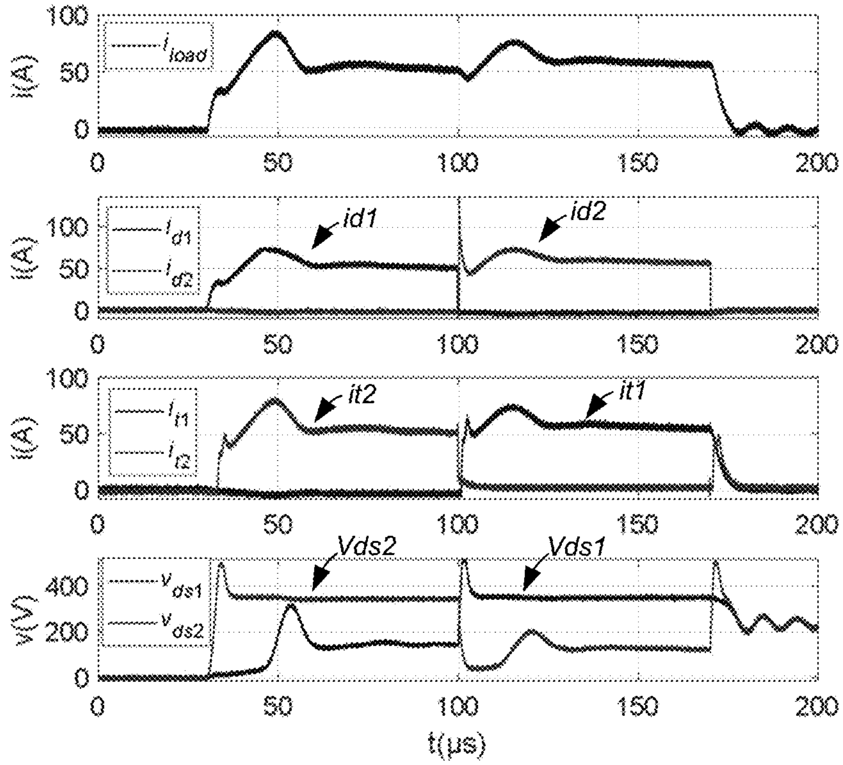
FIG. 9 illustrates test waveform graphs of an example limiting control technique with load inductance, according to one example of the present disclosure.

The test waveforms of the proposed current-limiting strategy are shown in FIGS. 8-9. In FIG. 8, the proposed current limiting strategy is tested without load inductance. Similar to the test results in FIG. 7, the load current decreases after the junction temperature of each device increases. For measured $v_{ds1}$ and $v_{ds2}$, a higher voltage can be observed at the beginning of the TVS breakdown. This phenomenon is called 'foldback', which is a special characteristic of the high power TVS diode to provide a lower clamping voltage than the avalanche to withstand high fault current within a small package. Note that when $S_2$ turns on at t=100 μs, the load current decreases to around zero due to this high TVS breakdown voltage and the near-zero load inductance. This is acceptable for a system with potential fault while the SSCB keeps the current limiting status with devices not being fully turned off.

In FIG. 9, the proposed current limiting strategy is tested with a load inductance of 38 μH. With higher load inductance, the load current varies smoothly and is successfully limited for 140 μs, which is the maximum current limiting withstand time from the thermal simulation model. For both tests of the proposed current limiting strategy, the gate-to-source voltage is the same as the conventional case of 1.8 V to have a similar limited current level for a fair comparison.

Results Comparison

The energies dissipated in each component, and the current limiting withstand time of the 2 methods are compared in TABLE I of FIG. 10. Using the proposed current limiting strategy, with a similar GaN HEMT energy dissipation, the short circuit withstand time can be increased from 38 μs to 140 μs (3.7×) without adding extra hardware. Also, TVS diodes are verified to generate and absorb a major part of the energy in the proposed control strategy.

As such, the embodiments of the present disclosure propose a novel current limiting control strategy for series-connected SSCB switching cells. The current limiting function is enhanced by utilizing the higher robustness and energy absorption capability of TVS diodes and alternating two GaN switches. Besides, no extra hardware is needed. The proposed strategy is verified to have a longer current limiting withstand time of 140 μs (~3.7× of the conventional method of 38 μs) without requiring extra hardware. Besides, for only 2 SSCB switching cells in series, no voltage balancing is needed for the current limiting period. Additionally, the proposed control strategy can be extended to cases with more than 2 SSCB switching cells in series.

Comparing with conventional SSCBs, the proposed current limiting scheme utilizes the energy capability of both semiconductor switches and the energy absorption units in the SSCB to enlarge the current limiting withstand time. The energy absorption unit works during the current limiting control and most energy is dissipated inside the energy absorption unit instead of semiconductor switches. Compared to semiconductor switches, the dedicated energy absorption unit features a higher robustness and energy absorption capability. Therefore, the proposed technology can enable longer current limiting withstand time to meet the protection requirement of the power system and requires no additional hardware compared to other SSCBs.

Figure 11:
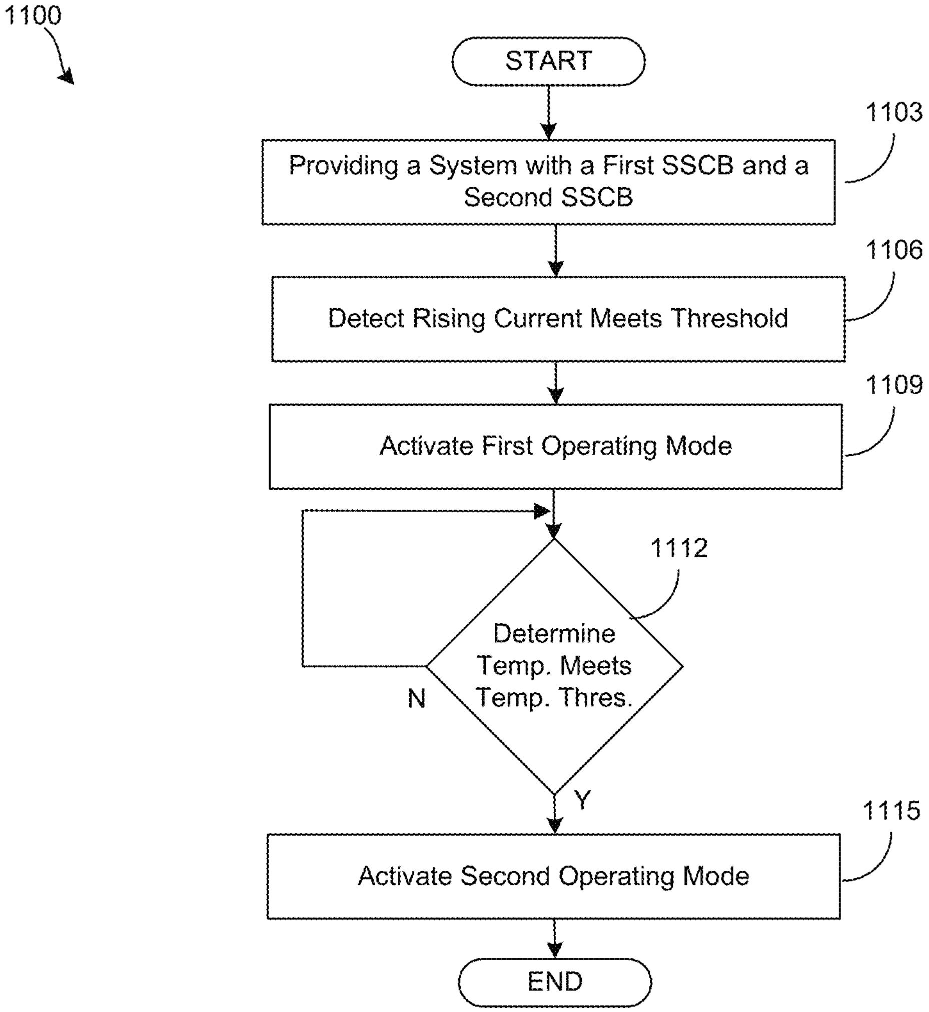
FIG. 11 is a flowchart illustrating one example method of operation for system, according to one example of the present disclosure.

Referring next to FIG. 11, shown is a flowchart that provides one example method 1100 of the operation of a portion of a system for SSCBs. The flowchart of FIG. 11 provides merely an example of the many different types of functional arrangements that can be employed to implement the operation of the depicted portion of the system.

In block 1103, the method 1100 includes providing a system that comprises a first solid state circuit breaker (SSCB) in series with a second SSCB. The first SSCB can include a first energy absorption component and a first switch, and the second SSCB can include a second energy absorption component and a second switch. In some examples, the system can include a control circuit for monitoring for a rising current of an overcurrent event (e.g., current surge) or a short circuit and for controlling the switches to be placed in different operating modes. In examples, the control circuit can include a microcontroller for controlling one or more operations for the system.

In block 1106, the method 1100 includes detecting a rising current of an overcurrent event exceeds a current threshold at an input of the system. The overcurrent event can represent a fault current, an inrush of current during a start up, or other suitable overcurrent events. A fault current is an unintended, uncontrolled, high current flow through an electrical system. In some examples, the control circuit can be used to identify the rising current of the overcurrent event. In one example, the control circuit includes a reference circuit that compares the input current to a reference current. When the input current meets a current threshold, the reference circuit can manipulate the switches of the SSCBs in order to place the system in a first operating mode. In another example, a microcontroller in combination with one or more other circuit components (e.g., analog-digital converter, an operational amplifier, resistor) can be used to identify the rising current meeting a current threshold. Upon determining the current thresholds has been met, the microcontroller can manipulate the switches of the SSCBs in order to place the system in a first operating mode.

In block 1109, the method 1100 includes activating, by the system, the first operating mode by setting the first switch to an off state and setting the second switch to saturation mode by adjusting a second gate voltage of the second switch. As discussed above, a control circuit and/or a microcontroller can be used to activate the first operating mode by manipulating the first switch and the second switch. In some examples, the second switch is set to saturation made by lowering the gate voltage of the second switch. The first switch can be turned off by adjusting the gate voltage to a cut-off region voltage.

In block 1112, the method 1100 includes determining a temperature of the second switch meets a temperature threshold. In some examples, one or more circuit components can be used to determine the temperature of the second switch and compare the temperature to a temperature threshold for the second switch. For example, the temperature can be determined based at least in part on a dynamic thermal impedance and a power dissipation for the second switch. The power dissipation can be calculated by measuring and/or calculating one or more electrical parameters, such as a voltage drop across the second switch, a current for the second switch, or other suitable parameters. In some example, the temperature threshold for the second switch can be a value stored in the microcontroller. If the temperature meets the temperature threshold, then the method 110 proceeds to block 1115. If the temperature does not meet the temperature threshold, then the method 110 proceeds to block 1112.

In block 1115, the method 1100 includes activating the second operating mode by setting the second switch to an off state and setting first switch to saturation mode by adjusting a first gate voltage of the first switch based at least in part on the temperature of the second switch meeting the temperature threshold.

As discussed above, a control circuit and/or a microcontroller can be used to activate the second operating mode by manipulating the first switch and the second switch. In some examples, the first switch is set to saturation made by lowering the gate voltage of the first switch. The second switch can be turned off by adjusting the gate voltage to a cut-off region voltage.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:

a first solid state circuit breaker (SSCB) switching cell that comprises a first energy absorption component and a first switch;

a second SSCB switch cell that is electrically coupled in series with the first SSCB, the second SSCB comprising a second energy absorption component and a second switch;

a control circuit that is configured to operate in a first operating mode and a second operating mode for the first SSCB and the second SSCB; and the control circuit is configured to:

detect a rising current of an overcurrent or short circuit event exceeds a current threshold at an input;

activate the first operating mode by setting the first switch to an off state and setting the second switch to saturation mode by adjusting a second gate voltage of the second switch;

determine a temperature of the second switch meets a temperature threshold; and activate the second operating mode by setting the second switch to an off state and setting first switch to saturation mode by adjusting a first gate voltage of the first switch based at least in part on the temperature of the second switch meeting the temperature threshold.

2. The system of claim 1, wherein the first energy absorption component or the second energy absorption component comprises at least one of a transient voltage suppression diode, a snubber circuit, a metal oxide varistor (MOV), or a voltage-dependent resistor.

3. The system of claim 1, wherein the first switch or the second switch comprises at least one of a high electron mobility transistor, a metal-oxide-semiconductor field-effect transistor (MOSFET), or an insulated-gate bipolar transistor (IGBT).

4. The system of claim 1, wherein the first energy absorption component or the second energy absorption component has a clamping voltage in a range between a half of an input voltage and the input voltage.

5. The system of claim 1, wherein the first energy absorption component is electrically coupled in parallel to the first switch.

6. The system of claim 1, wherein the temperature of the second switch is determined based at least in part on a dynamic thermal impedance and a power dissipation for the second switch or determined based on real-time junction temperature monitor of the second switch.

7. The system of claim 1, wherein the first SSCB switching cell and the second SSCB switch cell have a current withstand time based at least in part on a first current withstand for the first operating mode and a second current withstand for the second operating mode.

8. The system of claim 1, wherein the temperature threshold is approximate to a temperature limit for the second switch.

9. The system of claim 1, wherein the control circuit comprises an analog circuit with a timer for determining that the temperature of the second switch meets the temperature threshold or a microcontroller for determining that the temperature of the second switch meets the temperature threshold.

10. The system of claim 9, wherein the microcontroller comprises a temperature sensor for measuring the temperature of the second switch.

11. The system of claim 1, wherein the first operating mode and second operating mode are reversed.

12. A method of operating a current limiting function for solid-state circuit breakers, comprising:

providing a system that comprises a first solid state circuit breaker (SSCB) in series with a second SSCB, the first SSCB having a first energy absorption component and a first switch, the second SSCB having a second energy absorption component and a second switch;

detecting, by the system, a rising current of an overcurrent or short circuit event exceeds a current threshold at an input of the system;

activating, by the system, the first operating mode by setting the first switch to an off state and setting the second switch to saturation mode by adjusting a second gate voltage of the second switch;

determining, by the system, a temperature of the second switch meets a temperature threshold; and activating, by the system, the second operating mode by setting the second switch to an off state and setting first switch to saturation mode by adjusting a first gate voltage of the first switch based at least in part on the temperature of the second switch meeting the temperature threshold.

13. The method of claim 12, wherein the first energy absorption component or the second energy absorption component comprises at least one of a transient voltage suppression diode, a snubber circuit, a metal oxide varistor (MOV), or a voltage-dependent resistor.

14. The method of claim 12, wherein the first switch or the second switch comprises at least one of a high electron mobility transistor, a metal-oxide-semiconductor field-effect transistor (MOSFET), or an insulated-gate bipolar transistor (IGBT).

15. The method of claim 12, wherein the first energy absorption component or the second energy absorption component has a clamping voltage in a range between a half of an input voltage and the input voltage.

16. The method of claim 12, wherein the first energy absorption component is electrically coupled in parallel to the first switch.

17. The method of claim 12, wherein the temperature of the second switch is determined based at least in part on a dynamic thermal impedance and a power dissipation for the second switch.

18. The method of claim 12, wherein the first SSCB switching cell and the second SSCB switch cell have a current withstand time based at least in part on a first current withstand for the first operating mode and a second current withstand for the second operating mode.

19. The method of claim 12, wherein the temperature threshold is approximate to a temperature limit for the second switch.

20. The method of claim 12, wherein determining that the temperature of the second switch meets the temperature threshold is performed by a microcontroller of the system or the temperature threshold is pre-calculated and performed by an analog control circuit with a timer to count for the pre-calculated current limiting time.

21. The method of claim 20, wherein the microcontroller comprises a temperature sensor for measuring the temperature of the second switch.

22. The system of claim 12, the first operating mode and second operating mode are reversed.

* * * * *